United States Patent
Morita et al.

(10) Patent No.: US 9,483,219 B2
(45) Date of Patent: Nov. 1, 2016

(54) INFORMATION PROCESSING SYSTEM, INFORMATION PROCESSOR, NON-TRANSITORY COMPUTER READABLE MEDIUM, AND INFORMATION PROCESSING METHOD

(71) Applicant: FUJI XEROX CO., LTD., Tokyo (JP)

(72) Inventors: Masao Morita, Kanagawa (JP); Tadao Michimura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/016,361

(22) Filed: Feb. 5, 2016

(65) Prior Publication Data

US 2016/0162232 A1 Jun. 9, 2016

Related U.S. Application Data

(62) Division of application No. 14/243,481, filed on Apr. 2, 2014, now Pat. No. 9,286,010.

(30) Foreign Application Priority Data

Jul. 25, 2013 (JP) ................................. 2013-154375

(51) Int. Cl.
*G06F 3/12* (2006.01)
*G06F 9/455* (2006.01)
(Continued)

(52) U.S. Cl.
CPC .......... *G06F 3/1236* (2013.01); *G06F 3/1203* (2013.01); *G06F 3/1237* (2013.01); *G06F 3/1238* (2013.01); *G06F 3/1287* (2013.01); *G06F 9/45533* (2013.01); *G06F 9/45558* (2013.01); *H04N 1/00204* (2013.01); *H04N 1/00244* (2013.01); *H04N 1/00464* (2013.01); *G06F 3/1267* (2013.01); *G06F 2009/4557* (2013.01); *H04N 2201/0094* (2013.01)

(58) Field of Classification Search
None
See application file for complete search history.

(56) References Cited

U.S. PATENT DOCUMENTS

2005/0141444 A1* 6/2005 Hirai ...................... H04L 49/90
370/313
2007/0288623 A1 12/2007 Kato et al.
(Continued)

FOREIGN PATENT DOCUMENTS

| JP | 2008-004110 A | 1/2008 |
|----|---------------|--------|
| JP | 4127315 A | 7/2008 |

(Continued)

*Primary Examiner* — Beniyam Menberu
(74) *Attorney, Agent, or Firm* — Sughrue Mion, PLLC (57) ABSTRACT

An information processing system has a terminal apparatus, an information processor, and an image processor connected to one another. The information processor includes first and second virtual machines, a first receiving unit receiving a connection request from the image processor, a first forwarding unit forwarding the connection request to the first machine, a second receiving unit receiving another connection request from the terminal apparatus, and a second forwarding unit forwarding the another connection request to the second machine. The second machine includes an acquiring unit receiving identifying information of the image processor selected by a user and acquiring first machine identifying information based on the identifying information, a connection transfer requesting unit requesting the first machine to transfer an authority to connect to the image processor based on the first machine identifying information, and a connecting unit receiving the authority and connecting the second machine and the image processor.

2 Claims, 9 Drawing Sheets

(51) Int. Cl.
*H04N 1/00* (2006.01)
*G06K 15/02* (2006.01)

(56) References Cited

U.S. PATENT DOCUMENTS

2011/0126110 A1* 5/2011 Vilke .................. G06F 9/54
    715/736

2011/0131271 A1* 6/2011 Jung ................. H04L 29/08846
    709/203
2011/0321065 A1* 12/2011 Gopalakrishnan ...... G06F 9/545
    719/328

FOREIGN PATENT DOCUMENTS

| JP | 4720959 B2 | 7/2011 | |
|---|---|---|---|
| WO | 2013/001718 A1 | 1/2013 | |
| WO | WO 2013/001718 * | 1/2013 | ............... G06F 3/12 |

* cited by examiner

INFORMATION PROCESSING SYSTEM, INFORMATION PROCESSOR, NON-TRANSITORY COMPUTER READABLE MEDIUM, AND INFORMATION PROCESSING METHOD

CROSS-REFERENCE TO RELATED APPLICATIONS

This application is a Divisional of U.S. patent application Ser. No. 14/243,481, filed on Apr. 2, 2014, which is based on and claims priority under 35 USC 119 from Japanese Patent Application No. 2013-154375 filed Jul. 25, 2013, the contents of all of which are incorporated herein by reference in their entirety.

BACKGROUND (i) Technical Field

The present invention relates to an information processing system, an information processor, a non-transitory computer readable medium, and an information processing method.

(ii) Related Art

In the past, systems have been proposed which manage access to a device connected to a server via a network.

Further, so-called cloud computing has been proposed in recent years which is a utilization form of a computer, in which data and the functions of software, hardware, and so forth present in a client computer are transferred to a group of servers on the Internet to allow a user to use only necessary parts of the data and the functions as needed via the Internet. In cloud computing, it is required to easily establish connection between the computer (terminal apparatus) operated by the user and a device which the user wants to use, while realizing scale-out. Herein, the device is a peripheral apparatus (image processor) of the computer, such as a scanner, a printer, or a multifunction machine.

SUMMARY

According to an aspect of the invention, there is provided an information processing system having at least one terminal apparatus, an information processor, and an image processor connected to one another. The information processor includes a first virtual machine, a second virtual machine, a first receiving unit, a first forwarding unit, a second receiving unit, and a second forwarding unit. The first receiving unit receives a connection request from the image processor connected to the information processor via a network. The first forwarding unit forwards the connection request received by the first receiving unit to the first virtual machine of the information processor. The second receiving unit receives a connection request from the terminal apparatus connected to the information processor via the network. The second forwarding unit forwards the connection request received by the second receiving unit to the second virtual machine of the information processor. The second virtual machine includes an acquiring unit, a connection transfer requesting unit, and a connecting unit. Upon receipt of identifying information of the image processor selected by a user via the terminal apparatus, the acquiring unit acquires first virtual machine identifying information for identifying the first virtual machine on the basis of the identifying information of the image processor. The connection transfer requesting unit requests the first virtual machine to transfer a connection authority to connect to the image processor to the second virtual machine on the basis of the acquired first virtual machine identifying information. The connecting unit connects the second virtual machine and the image processor upon receipt of the connection authority from the first virtual machine.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

Figure 1:
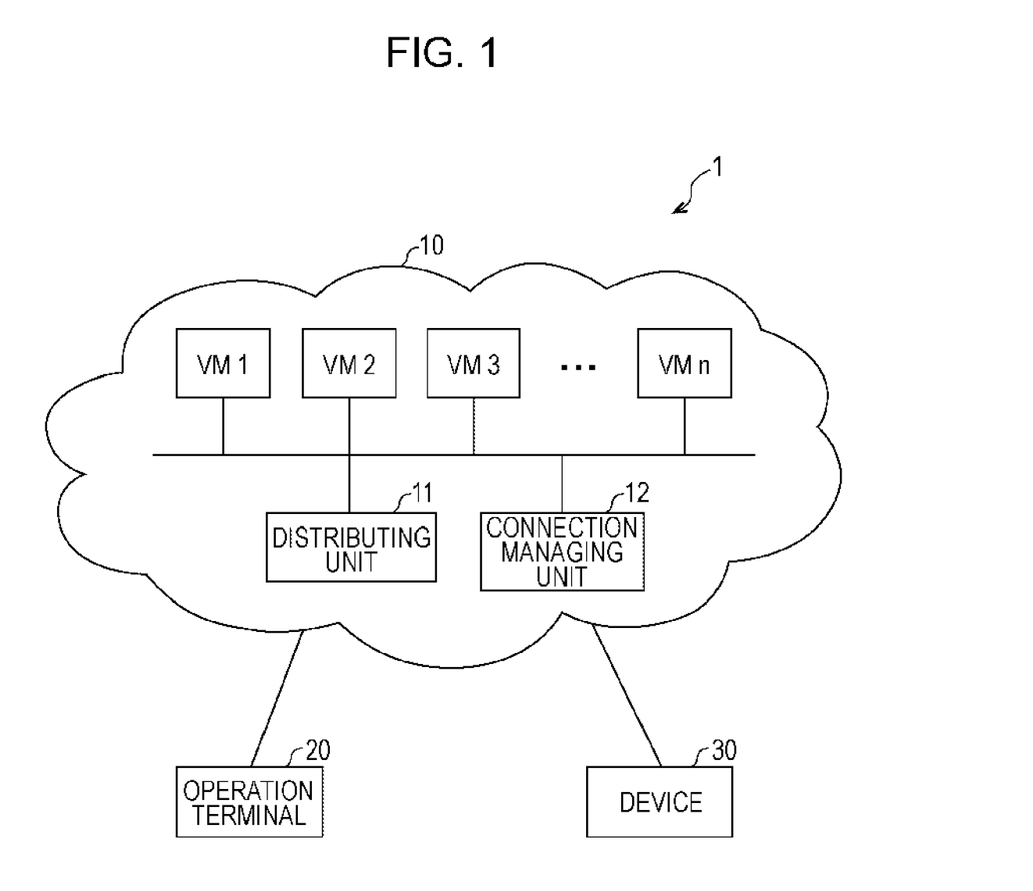
FIG. 1 is a functional block diagram of a device connection managing system according to the present exemplary embodiment.

FIG. 1 is a functional block diagram of a device connection managing system 1 according to the present exemplary embodiment. As illustrated in the drawing, the device connection managing system 1 (information processing system) includes a device managing unit 10 (information processor), an operation terminal 20 (terminal apparatus), and a device 30 (image processor). The operation terminal 20 and the device 30 are each connected to the device managing unit 10 via a network such as the Internet. That is, the device connection managing system 1 is a system that manages the connection between the operation terminal 20 and the device 30 in cloud computing realized by including the operation terminal 20, the device 30, and the device managing unit 10 connected to the operation terminal 20 and the device 30 via the network. In the device connection managing system 1 in FIG. 1, the single operation terminal 20 and the single device 30 are illustrated. However, the invention is not limited thereto. Thus, there may be plural operation terminals 20 and plural devices 30.

The operation terminal 20 is an apparatus operated or instructed by a user, such as a personal computer (PC), a personal digital assistant (PDA), or a smartphone, for example.

The device 30 is a peripheral apparatus commonly connected to a PC or the like by wire or wirelessly, and serves as an image processor such as a scanner, a printer, or a multifunction machine, for example. The device 30 has a communication function, and is connected to the device managing unit 10 via the network. The device 30 may be network-connected to the device managing unit 10 via a repeater or another operation terminal having a communication function.

The device managing unit 10 is a group of servers constructed in a cloud, and includes a distributing unit 11, a connection managing unit 12, and plural virtual machines (VMs).

The VMs are virtual machines constructed in a cloud environment, and serve as logical (virtual) computers divided from a physical computer by a virtualization technology and operating with respective independent operating systems. FIG. 1 illustrates the n number of VMs.

The distributing unit 11 unitarily manages connection requests received from the operation terminal 20 and the device 30 via the network, and forwards each of the connection requests to an arbitrary VM. That is, the distributing unit 11 is a load balancer that distributes and allocates processes to the plural VMs such that the VMs have equal loads. For example, the distributing unit 11 forwards a connection request to a VM having reserve capacity among the plural VMs constructed in the cloud. The distributing unit 11 has the functions of a receiving unit that receives the above-described connection request and a forwarding unit that forwards the connection request.

The connection managing unit 12 registers and manages job information (job identifier (ID)) received from the operation terminal 20 via the network, information of a VM network-connected to the operation terminal 20, information of a VM network-connected to the device 30, and so forth. The connection managing unit 12 includes a memory that stores the above-described types of information. The memory may be provided outside the connection managing unit 12 (to the distributing unit 11, for example).

The above-described device connection managing system 1 is schematically configured to forward respective connection requests from the operation terminal 20 and the device 30 to different arbitrary VMs (temporarily connect the operation terminal 20 and the device 30 to different arbitrary VMs), and transfer a connection authority and/or a job of one of the VMs to the other VM on the basis of a request to use the device 30 received from the operation terminal 20, to thereby establish connection between the operation terminal 20 and the device 30 and execute the job.

Figure 2:
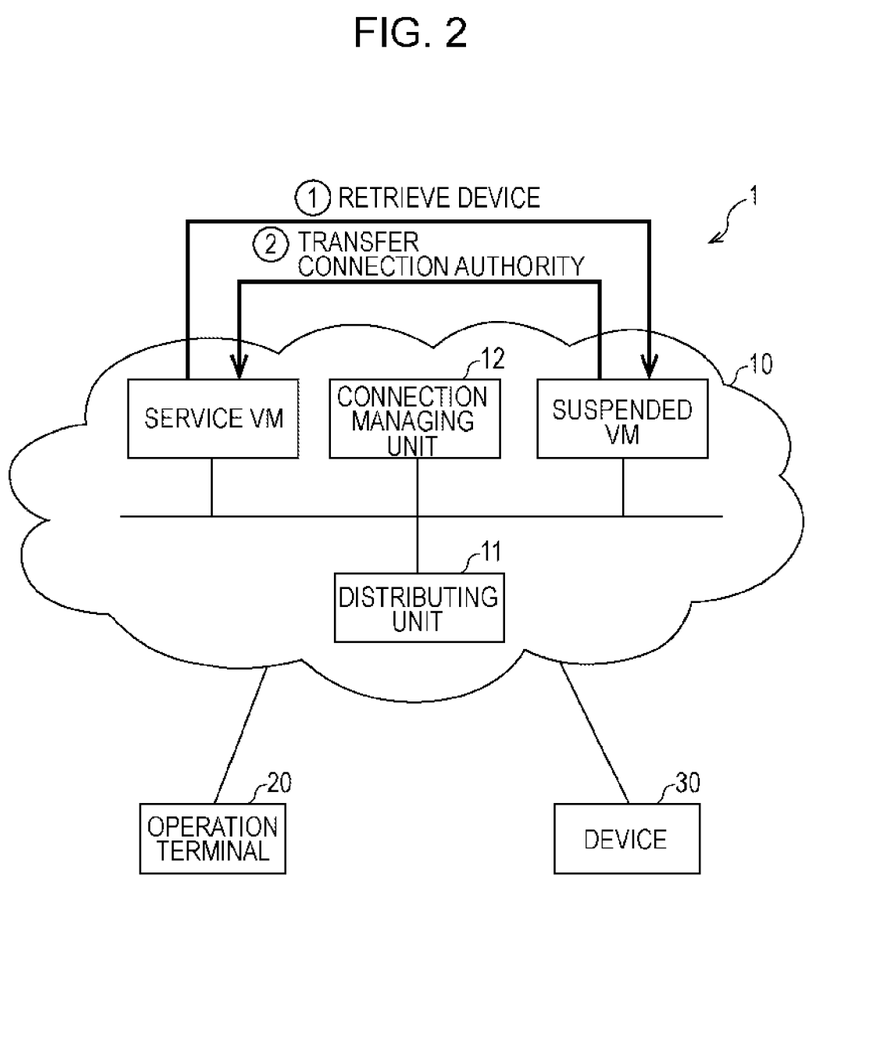
FIG. 2 is a schematic view illustrating a configuration of the device connection managing system according to a first example.
Figure 3:
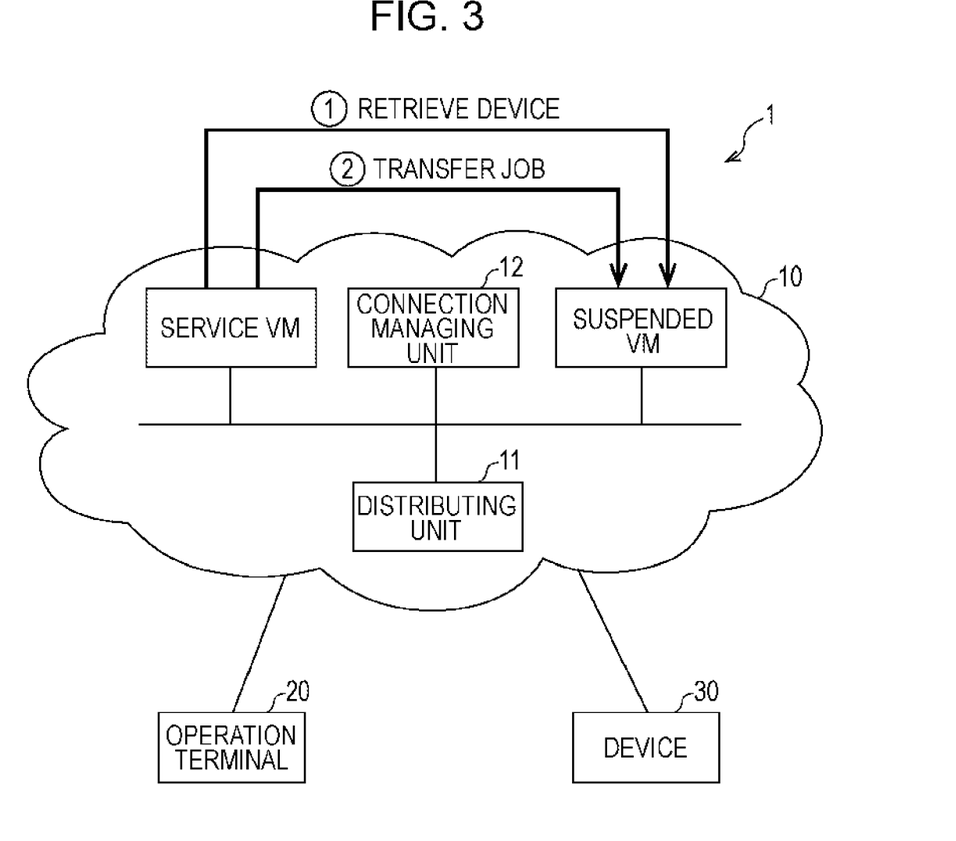
FIG. 3 is a schematic view illustrating a configuration of the device connection managing system according to a second example.

Herein, two methods (examples) are conceivable to realize the above-described configuration. FIG. 2 is a schematic view illustrating a configuration of the device connection managing system 1 according to a first example. According to the configuration of the first example, the VM connected to the operation terminal 20 (hereinafter referred to as the service VM) retrieves the VM connected to the device 30 (hereinafter referred to as the suspended VM), and the suspended VM transfers the connection authority to connect to the device 30 to the service VM to allow the service VM to execute the job. FIG. 3 is a schematic view illustrating a configuration of the device connection managing system 1 according to a second example. According to the configuration of the second example, the service VM connected to the operation terminal 20 retrieves the suspended VM connected to the device 30 and transfers the job to the suspended VM to allow the suspended VM to execute the job.

In the following, the processing of the device connection managing system 1 according to the above-described first and second examples will be described with reference to specific examples. Herein, a scanner will be described as an example of the device 30.

First Example

Figure 4:
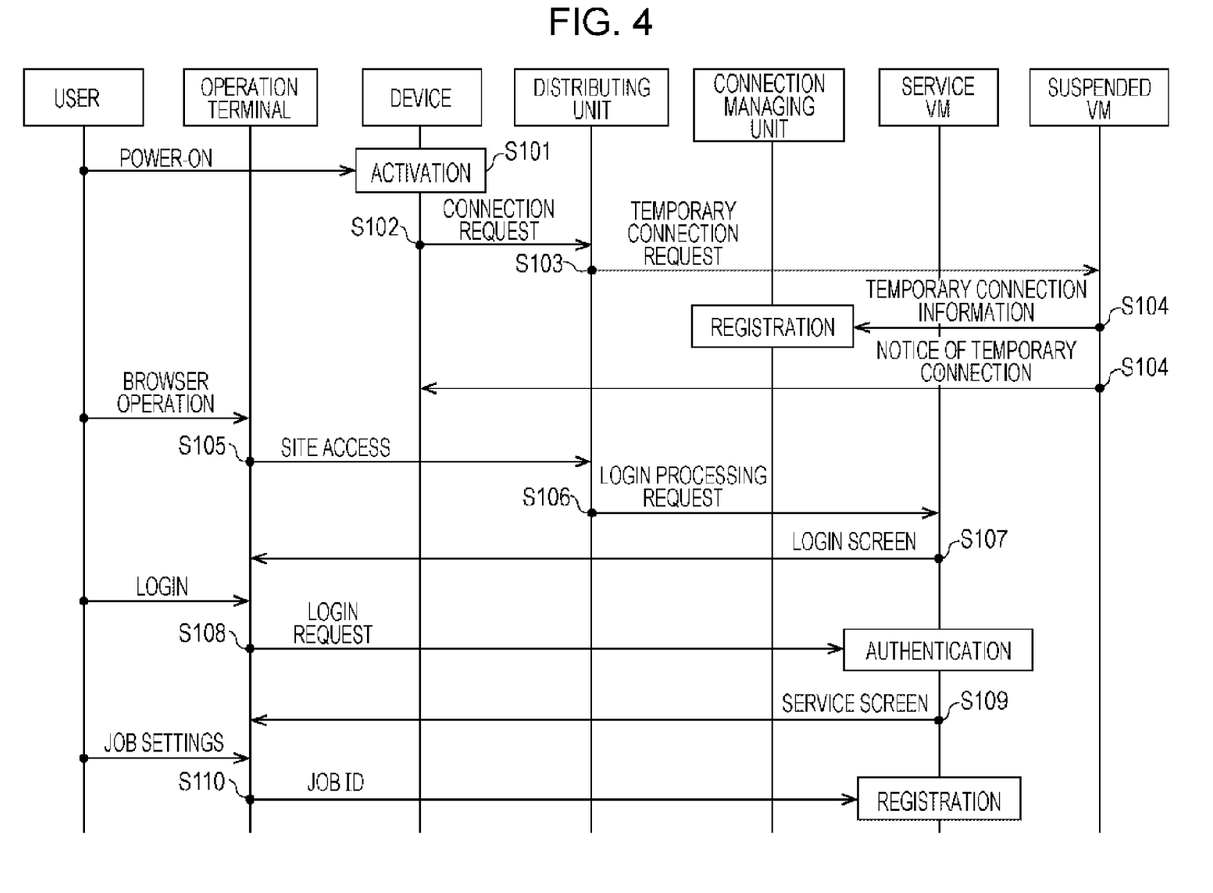
FIG. 4 is an operation flowchart of the device connection managing system according to the first example.
Figure 5:
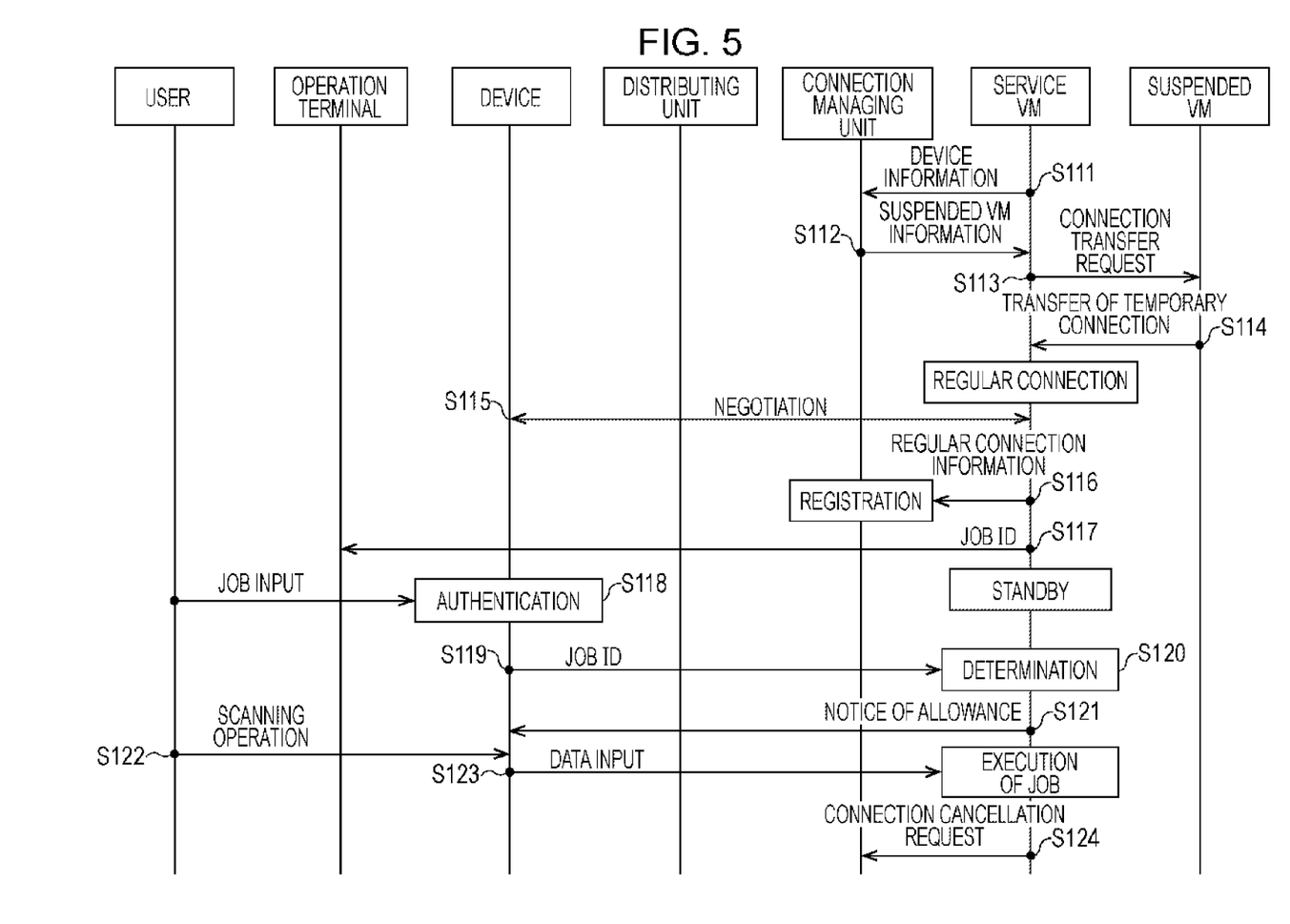
FIG. 5 is an operation flowchart of the device connection managing system according to the first example.

FIGS. 4 and 5 are operation flowcharts of the device connection managing system 1 according to the first example.

A user first powers on the device 30 (scanner). Thereby, the device 30 is activated (step S101). After the activation, the device 30 transmits a connection request to the distributing unit 11 (step S102). The connection request includes information for identifying the device 30 (device identifying information).

Upon receipt of the connection request from the device 30, the distributing unit 11 forwards the connection request (temporary connection request) to an arbitrary VM (the suspended VM, i.e., a first virtual machine) (step S103). The distributing unit 11 forwards the temporary connection request to a VM having a small load, such as a VM not registered with a job yet, for example.

Upon receipt of the temporary connection request from the distributing unit 11, the suspended VM establishes temporary connection with the device 30. After the establishment of the temporary connection, the suspended VM transmits temporary connection information to the connection managing unit 12, and transmits a notice of temporary connection completion to the device 30 (step S104). The temporary connection information includes the device identifying information and information for identifying the suspended VM (suspended VM identifying information) related to each other. It is therefore possible to identify the device 30 and the suspended VM temporarily connected to the device 30 from the temporary connection information.

Upon receipt of the temporary connection information from the suspended VM, the connection managing unit 12 registers the temporary connection information in the memory provided therein.

Thereafter, the user accesses a World Wide Web (Web) site with a Web browser by operating the operation terminal 20 (step S105). Herein, the Web site is a site relating to a scanner service in the cloud computing, for example.

Upon access to the Web site, the distributing unit 11 transmits a login processing request (connection request) to an arbitrary VM (the service VM, i.e., a second virtual machine) (step S106). The distributing unit 11 transmits the login processing request to a VM different from the suspended VM and having a small load, for example, similarly as described above. The login processing request includes information for identifying the operation terminal 20 of the user (terminal identifying information).

Upon receipt of the login processing request from the distributing unit 11, the service VM transmits a login screen to the corresponding operation terminal 20 (step S107).

After the operation terminal 20 receives the login screen from the service VM, the user inputs user information (a user ID and a password, for example) on the login screen displayed on a display of the operation terminal 20. Upon completion of the input, the operation terminal 20 transmits a login request including the user information to the service VM (step S108).

Upon receipt of the login request from the operation terminal 20, the service VM performs user authentication on the basis of the user information in the login request. If the user is authenticated, the service VM transmits a service screen to the operation terminal 20 (step S109). Thereby, the operation terminal 20 and the service VM are connected.

After the operation terminal 20 receives the service screen from the service VM, the user sets a job on the service screen displayed on the display of the operation terminal 20.

Specifically, the user selects the device 30 (scanner in this case), and reserves the execution of the job. After the user reserves the execution of the job, information for identifying the job (job ID) is generated in the device connection managing system 1 (step S110). The job (job ID) set by the user is related to the information for identifying the device 30 that is to be used (device identifying information).

The service VM registers the job ID in a memory provided therein, and transmits the device identifying information related to the job ID to the connection managing unit 12 (step S111).

Upon receipt of the device identifying information from the service VM, the connection managing unit 12 acquires the suspended VM identifying information related to the device identifying information by referring to the temporary connection information registered in the memory. The connection managing unit 12 transmits the acquired suspended VM identifying information to the service VM (step S112).

Upon receipt of the suspended VM identifying information from the connection managing unit 12, the service VM requests the suspended VM identified from the suspended VM identifying information to transfer the connection authority to connect to the device 30 to the service VM (transmits a connection transfer request to the suspended VM) (step S113). Upon receipt of the connection transfer request from the service VM, the suspended VM transfers the connection authority to connect to the device 30 to the service VM (step S114). With the transfer of the connection authority to the service VM, the device 30 and the service VM are regularly connected.

After the device 30 and the service VM are regularly connected, negotiation takes place therebetween to exchange information such as conditions for communication between the device 30 and the service VM (step S115).

Upon completion of the above-described regular connection, the service VM transmits regular connection information to the connection managing unit 12, and the connection managing unit 12 registers the regular connection information in the memory (step S116). The regular connection information includes the job ID, identifying information of the service VM (service VM identifying information), and the identifying information of the device 30 (device identifying information) related to one another. Further, the service VM transmits the job ID to the operation terminal 20, and thereafter stands by for an instruction from the device 30 (step S117).

Thereafter, the user inputs the job ID to the device 30, which the user is going to use, and the device 30 performs authentication (reception) of the job ID (step S118). If the input job ID is authenticated, the device 30 transmits the job ID to the service VM (step S119). The device 30 may transmit the job ID to the service VM without performing the authentication of the input job ID.

Upon receipt of the job ID from the device 30, the service VM performs preliminary check for data forwarding. That is, the service VM compares the job ID included in the regular connection information with the job ID received from the device 30, and determines whether or not the two job IDs match (step S120). The service VM may perform the above-described determining process on the basis of the regular connection information registered in the memory thereof or with reference to the regular connection information registered in the memory of the connection managing unit 12.

If the job ID included in the regular connection information and the job ID received from the device 30 match, the service VM transmits a notice of allowance to the device 30 (step S121). The device 30 becomes available upon receipt of the above-described notice of allowance from the service VM, and the user performs a scanning operation (step S122). The device 30 inputs data for executing the reserved job (scanned data) to the service VM, and the service VM executes the job (step S123).

After the execution of the job, the service VM transmits a connection cancellation request to the connection managing unit 12 (step S124). The connection cancellation request includes the information of the job ID, the device identifying information, and the service VM identifying information related to one another. Upon receipt of the connection cancellation request from the service VM, the connection managing unit 12 cancels the regular connection between the device 30 and the service VM relating to the job ID.

With the above-described sequence of processes, the connection between the service VM and the device 30 is established, and the job corresponding to the job ID is executed. Accordingly, it is possible to easily establish connection between an operation terminal and a device, while realizing scale-out.

As described above, the service VM includes an acquiring unit, a connection transfer requesting unit, and a connecting unit. Upon receipt of the device identifying information of the device 30 selected by the user via the operation terminal 20, the acquiring unit acquires, on the basis of the device identifying information, the suspended VM identifying information from the memory that stores the device identifying information and the suspended VM identifying information related to each other. The connection transfer requesting unit requests the suspended VM to transfer the connection authority to connect to the device 30 to the service VM on the basis of the acquired suspended VM identifying information. The connecting unit connects the service VM and the device 30 upon receipt of the connection authority from the suspended VM. The service VM further includes an executing unit that executes the job on the device 30. That is, the service VM has the functions of the above-described units.

Further, the suspended VM includes a connection transferring unit that transfers the connection authority to the service VM upon receipt of the connection transfer request from the service VM. That is, the suspended VM has the function of the connection transferring unit.

Further, the device 30 includes an authenticating unit that performs authentication of the job ID presented by the user, and the device 30 transmits the authenticated job ID to the service VM. That is, the device 30 has the function of the authenticating unit.

Herein, the processing example illustrated in FIGS. 4 and 5 illustrates the case in which a single user inputs a job. However, the first example is not limited thereto, and is also applicable to a case in which plural users select the same device and input mutually different jobs to the device. The following description will be given of an example (modified example) in which plural users share the same device by inputting different jobs to the device.

Modified Example

Figure 6:
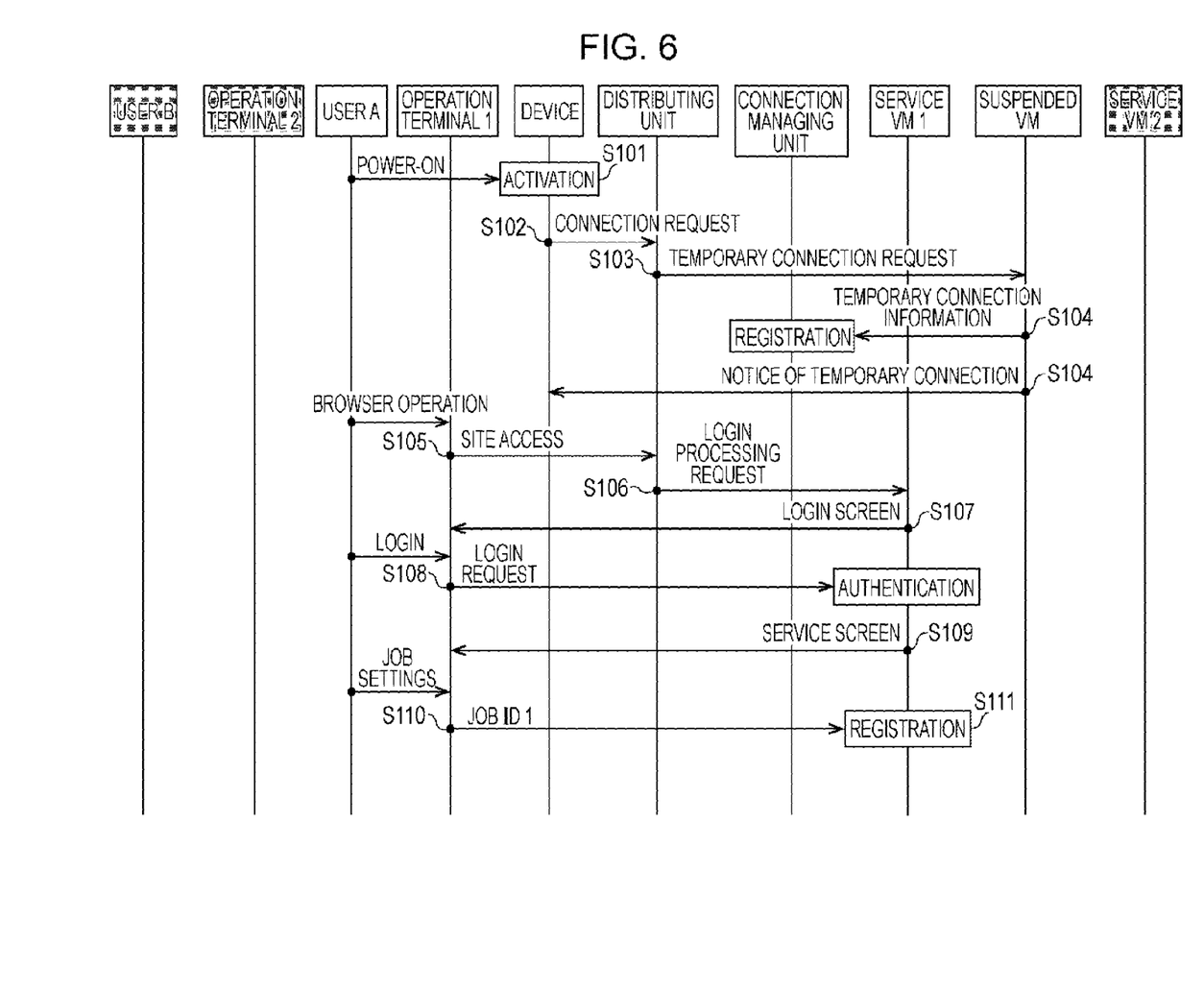
FIG. 6 is an operation flowchart of the device connection managing system according to a modified example.
Figure 7:
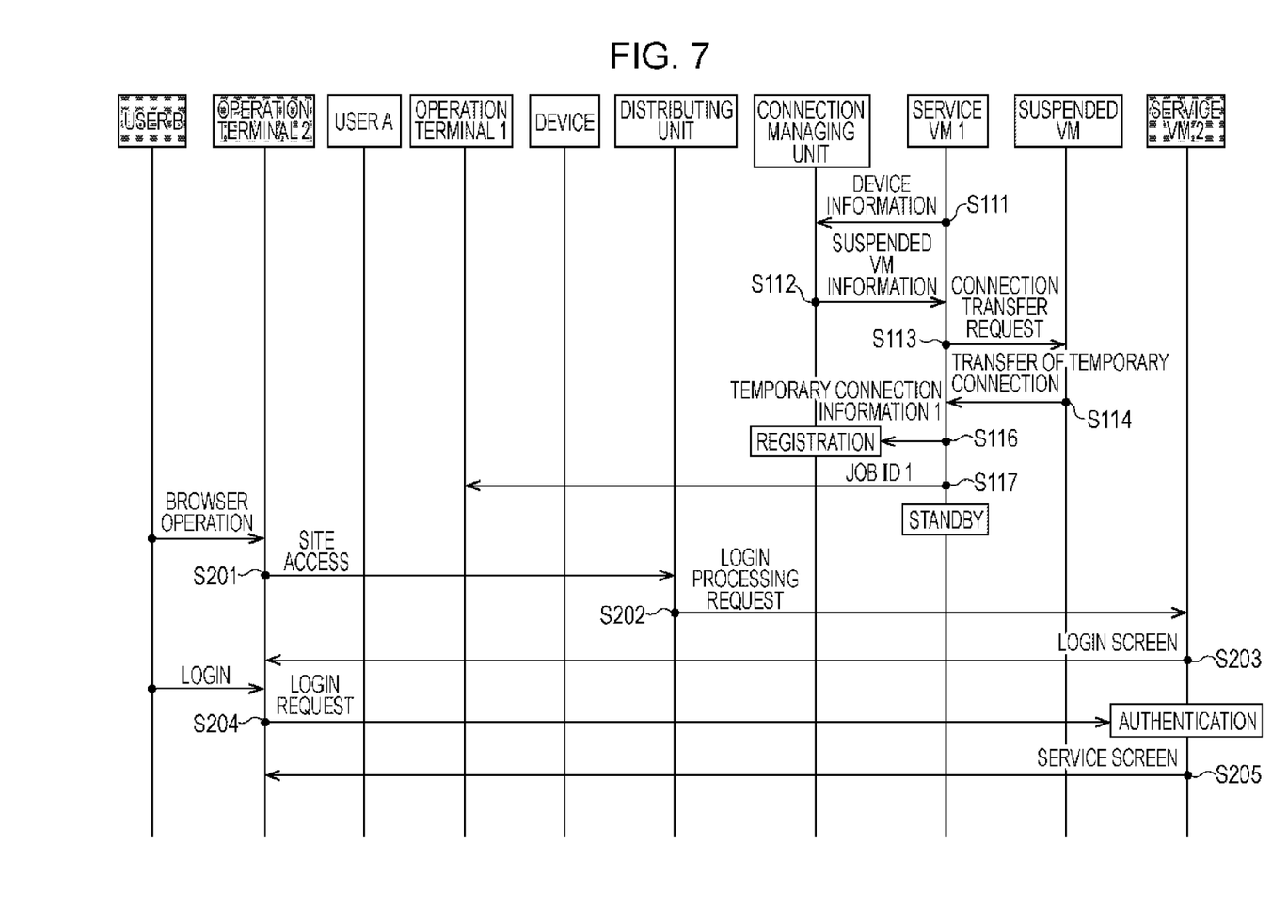
FIG. 7 is an operation flowchart of the device connection managing system according to the modified example.
Figure 8:
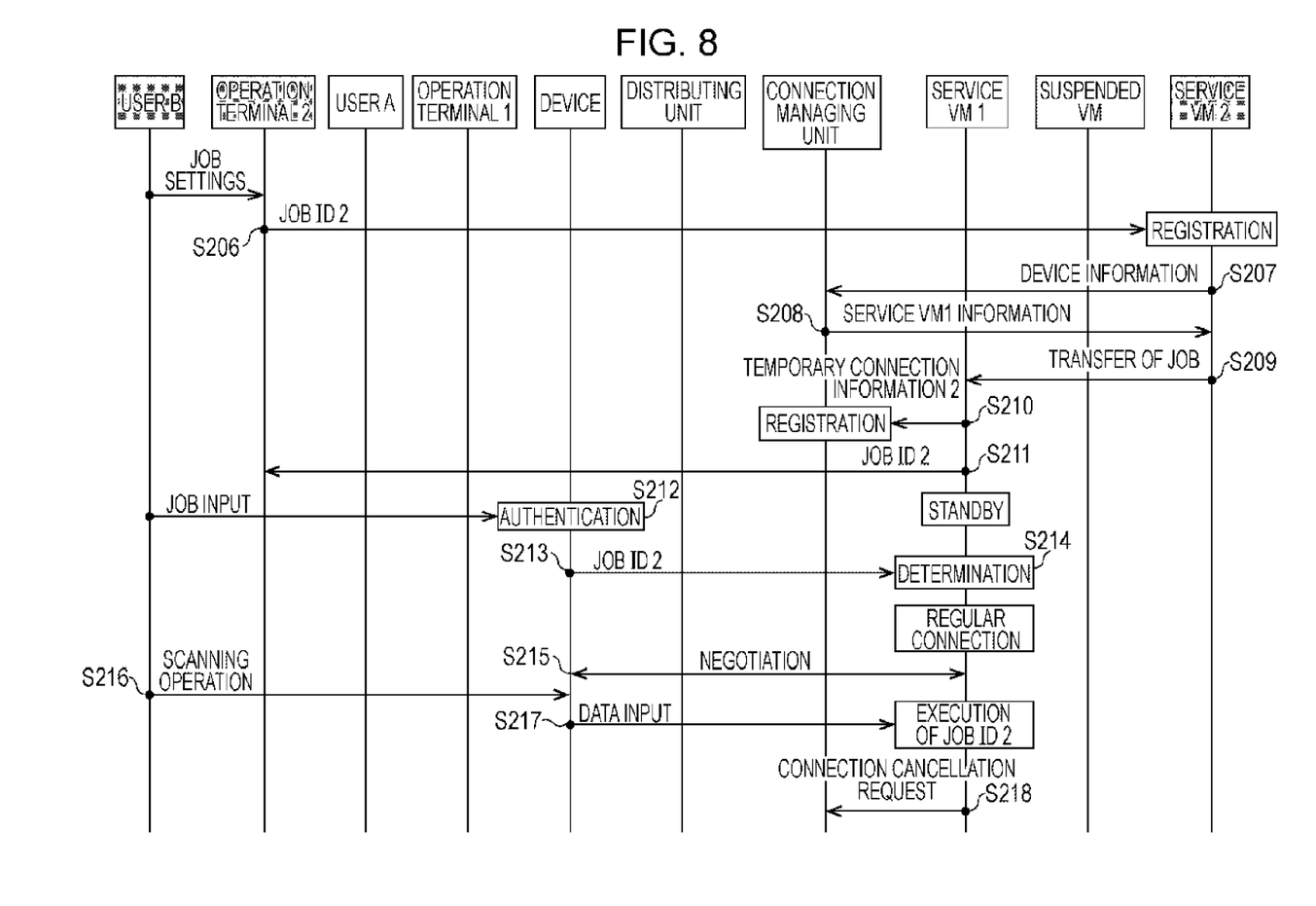
FIG. 8 is an operation flowchart of the device connection managing system according to the modified example.

FIGS. 6 to 8 are operation flowcharts of the device connection managing system 1 according to a modified example. Description of the same processes as those illustrated in FIGS. 4 and 5 will be omitted.

A user A, an operation terminal 1, and a service VM 1 in FIGS. 6 to 8 respectively correspond to the user, the operation terminal, and the service VM in FIGS. 4 and 5. In FIGS.

6 to 8, an operation terminal 2 is a terminal operated by a user B, and a service VM 2 is an arbitrary VM network-connected to the operation terminal 2. In the following, the operation terminal 1 and the operation terminal 2 will be referred to as the first operation terminal 20 and the second operation terminal 20, respectively.

The processing of FIGS. 6 to 8 is the same as the processing illustrated in FIGS. 4 and 5 until the job set by the user A and including the device identifying information is registered in the service VM 1 (step S111), the connection authority to connect to the device 30 is transferred from the suspended VM to the service VM 1 (step S114), a job ID 1 generated in the device connection managing system 1 is transmitted from the service VM 1 to the first operation terminal 20 (step S117), and the service VM 1 stands by for an instruction from the device 30. However, the process of regular connection and negotiation (step S115 in FIG. 5) is performed later. At step S116 in FIG. 7, therefore, temporary connection information 1 is transmitted from the service VM 1 to the connection managing unit 12 and registered in the memory of the connection managing unit 12. The temporary connection information 1 includes the job ID 1, identifying information of the service VM 1 (service VM 1 identifying information), and the identifying information of the device 30 (device identifying information) related to one another.

If the user B accesses the Web site with a Web browser by operating the second operation terminal 20 (step S201), the distributing unit 11 transmits a login processing request (connection request) to an arbitrary VM (the service VM 2, for example) (step S202). The login processing request includes information for identifying the second operation terminal 20 of the user B (terminal identifying information).

Upon receipt of the login processing request from the distributing unit 11, the service VM 2 transmits a login screen to the corresponding second operation terminal 20 (step S203).

After the second operation terminal 20 receives the login screen from the service VM 2, the user B inputs user information (a user ID, a password, and so forth) on the login screen displayed on a display of the second operation terminal 20. Upon completion of the input, the second operation terminal 20 transmits a login request including the user information to the service VM 2 (step S204).

Upon receipt of the login request from the second operation terminal 20, the service VM 2 performs user authentication on the basis of the user information in the login request. Then, if the user B is authenticated, the service VM 2 transmits a service screen to the second operation terminal 20 (step S205). Thereby, the second operation terminal 20 and the service VM 2 are temporarily connected.

After the second operation terminal 20 receives the service screen from the service VM 2, the user B sets a job on the service screen displayed on the display of the second operation terminal 20. Specifically, the user B selects the same device 30 (the same scanner in this case), and reserves the execution of the job. After the user B reserves the execution of the job, information for identifying the job (job ID 2) is generated in the device connection managing system 1 (step S206). The job (job ID 2) set by the user B is related to the device identifying information of the device 30, which is the same as that of the device 30 corresponding to the job ID 1.

The service VM 2 registers the job ID 2 in a memory provided therein, and transmits the device identifying information related to the job ID 2 to the connection managing unit 12 (step S207).

Upon receipt of the device identifying information from the service VM 2, the connection managing unit 12 acquires the identifying information of the service VM 1 related to the device identifying information by referring to the temporary connection information 1 registered in the memory. The connection managing unit 12 transmits the acquired service VM 1 identifying information to the service VM 2 (step S208).

Upon acquisition of the service VM 1 identifying information from the connection managing unit 12, the service VM 2 transfers the job of the job ID 2 to the service VM 1 identified from the service VM 1 identifying information (step S209).

Upon receipt of the job ID 2 from the service VM 2, the service VM 1 registers temporary connection information 2 in the memory (step S210). The temporary connection information 2 includes the job ID 2, the identifying information of the service VM 1 (service VM 1 identifying information), and the identifying information of the device 30 (device identifying information) related to one another. Further, the service VM 1 transmits the job ID 2 to the second operation terminal 20, and thereafter stands by for an instruction from the device 30 (step S211).

Thereafter, if the user B inputs the job ID 2 to the device 30, which the user B is going to use, before the user A does, and if the device 30 authenticates (receives) the job ID 2, for example (step S212), the device 30 transmits the job ID 2 to the service VM 1 (step S213). The device 30 may transmit the job ID 2 to the service VM 1 without performing the authentication of the input job ID 2.

Upon receipt of the job ID 2 from the device 30, the service VM 1 performs preliminary check for data forwarding. That is, the service VM 1 compares the job IDs 1 and 2 included in the temporary connection information 1 and 2 respectively with the job ID 2 received from the device 30, and determines whether or not there is a match therebetween (step S214).

If the job ID 2 included in the temporary connection information 2 matches the job ID 2 received from the device 30, the service VM 1 is regularly connected to the device 30, and performs negotiation with the device 30 (step S215). Then, the device 30 becomes available, and the user B performs a scanning operation (step S216). The device 30 inputs data for executing the job of the reserved job ID 2 (scan data) to the service VM 1, and the service VM 1 executes the job of the job ID 2 (step S217).

After the execution of the job of the job ID 2, the service VM 1 transmits a connection cancellation request to the connection managing unit 12 (step S218). The connection cancellation request includes the job ID 2, the device identifying information, and the service VM 1 identifying information related to one another. Upon receipt of the connection cancellation request from the service VM 1, the connection managing unit 12 cancels the regular connection between the device 30 and the service VM 1.

According to the processing of the above-described modified example, the job ID 2 of the user B authenticated (or transmitted) by the device 30 before the job ID 1 of the user A is executed. That is, it is possible that plural users appropriately share the same device 30.

Further, as described above, the service VM includes a memory that stores the plural job IDs received via the plural operation terminals 20 and a determining unit that determines whether or not the job ID authenticated by the device 30 matches the job ID stored in the memory. Further, the executing unit of the service VM is configured to execute on the device 30 the job of the job ID authenticated by the device 30 and matching the job ID stored in the memory. That is, the service VM has the function of the determining unit.

Further, upon receipt of the connection request from the first operation terminal 20, the distributing unit 11 forwards the connection request to the service VM 1. Further, upon receipt of the connection request from the second operation terminal 20, the distributing unit 11 forwards the connection request to the service VM 2. The service VM 2 is configured to transfer the job of the job ID 2, which the service VM 2 has received via the second operation terminal 20, to the service VM 1 having received the connection authority from the suspended VM.

Second Example

Figure 9:
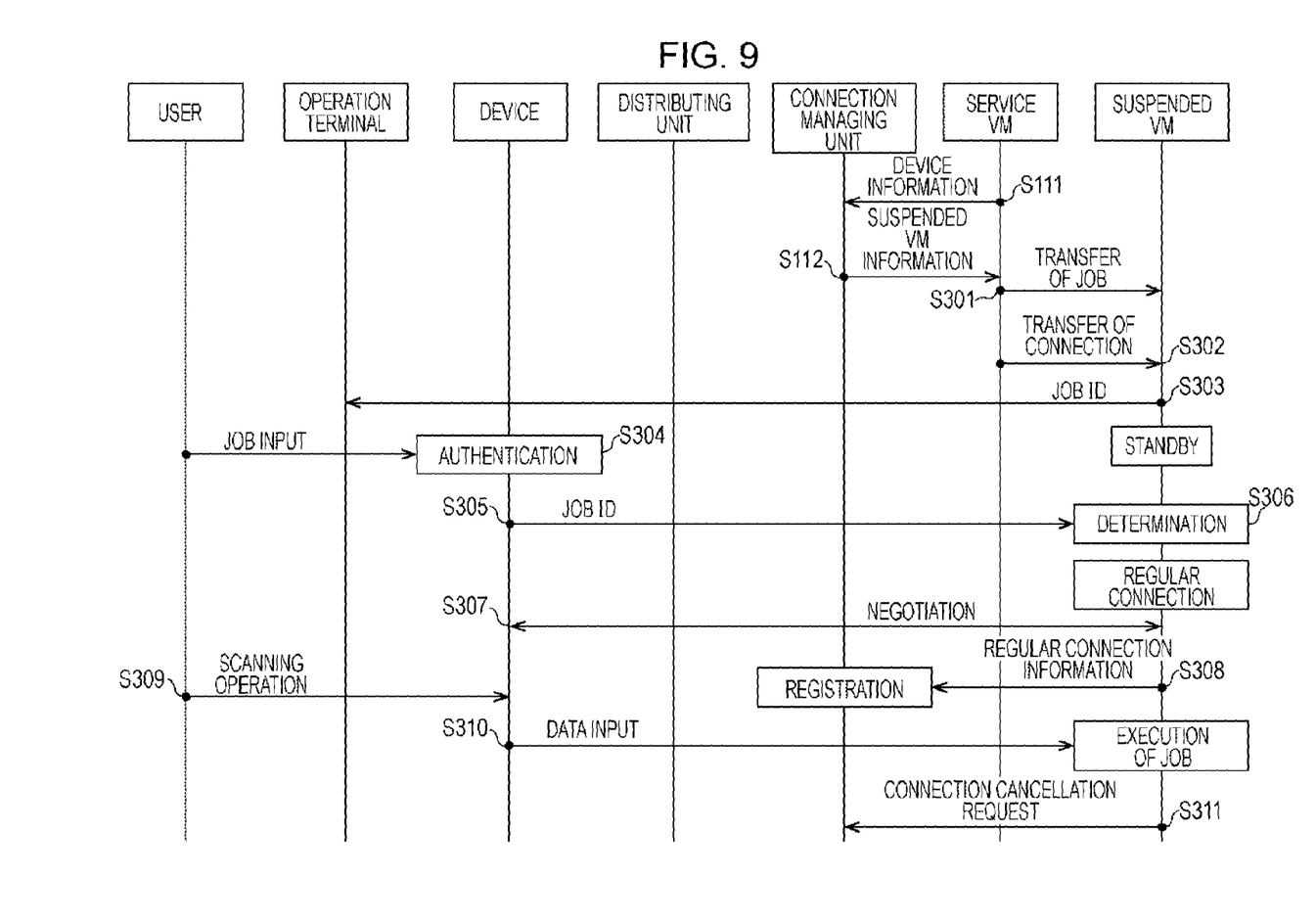
FIG. 9 is an operation flowchart of the device connection managing system according to the second example.

The processing of the device connection managing system 1 according to the second example will be described. The processing of the device connection managing system 1 according to the second example is the same as that of the first example up to the process in which the job set by the user is registered in the service VM (steps S101 to S112 in FIGS. 4 and 5). FIG. 9 illustrates a flow of operations performed after the above-described step S112 in the device connection managing system 1 according to the second example. The description herein will focus on differences from the first example.

Upon receipt of the suspended VM identifying information from the connection managing unit 12 (step S112), the service VM transfers the job set by the user to the corresponding suspended VM (step S301). Further, the service VM transfers the authority of the connection (step S109 in FIG. 4) established by the login of the operation terminal 20 to the suspended VM (step S302).

After the transfer of the job of the job ID and the connection authority to connect to the operation terminal 20, the suspended VM registers the job ID in a memory provided therein, transmits the job ID to the operation terminal 20, and thereafter stands by for an instruction from the device 30 (step S303).

Thereafter, the user inputs the job ID to the device 30, which the user is going to use, and the device 30 performs authentication (reception) of the job ID (step S304). If the input job ID is authenticated, the device 30 transmits the job ID to the suspended VM (step S305). The device 30 may transmit the job ID to the suspended VM without performing the authentication of the input job ID.

Upon receipt of the job ID from the device 30, the suspended VM performs preliminary check for data forwarding. That is, the suspended VM compares the job ID received from the service VM with the job ID received from the device 30, and determines whether or not the two job IDs match (step S306).

If the job ID received from the service VM and the job ID received from the device 30 match, the suspended VM is regularly connected to the device 30, and performs negotiation with the device 30 (step S307). Then, the device 30 becomes available, and the user performs a scanning operation (step S309). The device 30 inputs data for executing the reserved job (scan data) to the suspended VM, and the suspended VM executes the job (step S310).

After the execution of the job, the suspended VM transmits a connection cancellation request to the connection managing unit 12 (step S311). The connection cancellation request includes the job ID, the device identifying information, and the suspended VM identifying information related to one another. Upon receipt of the connection cancellation request from the suspended VM, the connection managing unit 12 cancels the regular connection between the device 30 and the suspended VM.

According to the above-described processing, it is possible to easily establish connection between a VM that is going to execute a job and a device while realizing scale-out. Further, according to the above-described processing, a job is transferred to and executed by a VM without switching of connection of the device between VMs. Accordingly, a load required for the above-described switching of connection is reduced. The present example is particularly effective in a case in which there is a relatively small amount of setting information of the job.

As described above, the service VM includes an acquiring unit and a transferring unit. Upon receipt of the device identifying information of the device 30 selected by the user via the operation terminal 20, the acquiring unit acquires, on the basis of the device identifying information, the suspended VM identifying information from the memory that stores the device identifying information and the suspended VM identifying information of the suspended VM related to each other. On the basis of the acquired suspended VM identifying information, the transferring unit transfers the connection authority to connect to the operation terminal 20 and the job set by the user and received via the operation terminal 20 to the suspended VM. That is, the service VM has the functions of the above-described units.

Further, the suspended VM includes a connecting unit and an executing unit. The connecting unit connects the suspended VM and the device 30 upon receipt of the connection authority to connect to the operation terminal 20 from the service VM. The executing unit executes the job on the device 30. That is, the suspended VM functions as the above-described units.

The functions of the above-described units included in the above-described device managing unit 10 (information processor) may be realized when a program stored in a computer readable information storage medium is read and executed by a computer including, for example, a controller such as a central processing unit (CPU), a storage unit such as a memory, and an input-output unit that transmits and receives data to and from an external device. The program may be supplied to the device managing unit 10 serving as a computer by an information storage medium, such as an optical disc, a magnetic disc, a magnetic tape, a magneto-optical disc, or a flash memory. Alternatively, the program may be supplied to the device managing unit 10 via a data communication network, such as the Internet.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system having a terminal apparatus, an information processor, and an image processor connected to one another, wherein the information processor comprises:
- a first virtual machine;
- a second virtual machine;
- a first receiving unit that receives a connection request from the image processor connected to the information processor via a network;
- a first forwarding unit that forwards the connection request received by the first receiving unit to the first virtual machine of the information processor;
- a second receiving unit that receives a connection request from the terminal apparatus connected to the information processor via the network; and
- a second forwarding unit that forwards the connection request received by the second receiving unit to the second virtual machine of the information processor, wherein the second virtual machine comprises:
- an acquiring unit that, upon receipt of identifying information of the image processor selected by a user via the terminal apparatus, acquires first virtual machine identifying information for identifying the first virtual machine on the basis of the identifying information of the image processor; and
- a transferring unit that transfers a connection authority to connect to the terminal apparatus and a job set by the user and received via the terminal apparatus to the first virtual machine on the basis of the acquired first virtual machine identifying information, and wherein the first virtual machine comprises a connecting unit that connects the first virtual machine and the image processor upon receipt of the connection authority from the second virtual machine.

2. The information processing system according to claim 1, wherein the first virtual machine further comprises an executing unit that executes the job on the image processor.

* * * * *